(12) United States Patent
Maryfield et al.

(10) Patent No.: US 7,864,408 B2
(45) Date of Patent: Jan. 4, 2011

(54) BEAM DEFLECTION USING PZT RESONANCE

(75) Inventors: Tony Maryfield, Poway, CA (US);
Mahyar Dadkhah, San Diego, CA (US)

(73) Assignee: Cubic Corporation, San Diego, CA (US)

( * ) Notice: Subject to any disclaimer, the term of this patent is extended or adjusted under 35 U.S.C. 154(b) by 163 days.

(21) Appl. No.: 12/247,634

(22) Filed: Oct. 8, 2008

(65) Prior Publication Data
US 2009/0122391 A1    May 14, 2009

Related U.S. Application Data

(63) Continuation-in-part of application No. 12/142,661, filed on Jun. 19, 2008.

(60) Provisional application No. 60/945,302, filed on Jun. 20, 2007.

(51) Int. Cl.
*G02B 26/08* (2006.01)
(52) U.S. Cl. ...................... 359/298; 359/318
(58) Field of Classification Search ................ 359/318, 359/298
See application file for complete search history.

(56) References Cited

U.S. PATENT DOCUMENTS

| | | | |
|---|---|---|---|
| 6,140,979 A * | 10/2000 | Gerhard et al. | 345/7 |
| 6,265,718 B1 | 7/2001 | Park et al. | |
| 2004/0151466 A1 | 8/2004 | Crossman-Bosworth et al. | |
| 2006/0284790 A1 | 12/2006 | Tegreene et al. | |
| 2008/0143979 A1 | 6/2008 | Konno | |

FOREIGN PATENT DOCUMENTS

| EP | 1626292 A | 2/2006 |
|---|---|---|
| WO | WO 96/02823 A | 2/1996 |

OTHER PUBLICATIONS

PCT International Search Report and Written Opinion mailed Nov. 13, 2008, International Application No. PCT/US2008/067661, 15 pages.
PCT International Search Report and Written Opinion mailed Dec. 9, 2009; International Application No. PCT/US2009/059863, 12 pages.

* cited by examiner

*Primary Examiner*—Jordan M. Schwartz
*Assistant Examiner*—James C Jones
(74) *Attorney, Agent, or Firm*—Townsend and Townsend and Crew, LLP

(57) ABSTRACT

Beam deflection devices and methods using piezoelectric tube resonance. A beam deflection device may include a laser that produces a beam of light. The beam of light may then be directed through a piezoelectric tube that includes a light guide and one or more piezoelectric elements. The device may also have an optical tip that extends axially from the end of the piezoelectric tube. The piezoelectric tube is coupled with the light source, such that the beam of light is conducted through the light guide and optionally the optical tip. A controller may be communicatively coupled with the light source and the piezoelectric tube. The controller may include instructions to activate the piezoelectric tube at a resonant frequency of the piezoelectric tube, the light guide, and/or the optical tip. The controller may include instructions to activate one or more of the piezoelectric elements at a different power level.

24 Claims, 9 Drawing Sheets

BEAM DEFLECTION USING PZT RESONANCE

CROSS-REFERENCES TO RELATED APPLICATIONS

This application is a continuation-in-part, and claims the benefit of commonly assigned U.S. patent application Ser. No. 12/142,661, filed Jun. 19, 2008, entitled "Combinational PZT And MEMS Beam Steering," which is a non-provisional of U.S. Provisional Patent Application No. 60/945,302, filed Jun. 20, 2007, entitled "Combinational PZT And MEMS Beam Steering," the entirety of each of which is herein incorporated by reference for all purposes.

BACKGROUND

This disclosure relates in general to piezoelectric light guides and, but not by way of limitation, to piezoelectric light guides as a dithering tool in a beam steering application among other things.

Atmospheric conditions often cause beam spreading and/or beam wander in a light beam. In some applications, light beams are used to communicate between a transmitter and a receiver. Due to such atmospheric affects, communication signals directed toward a receiver may be off target. Moreover, because these atmospheric affects are often transient, transmitters often employ beam steering and/or beam dithering protocols to track a receiver and/or adjust the beams transmission.

BRIEF SUMMARY

In one embodiment, the present disclosure provides for a beam steering system that includes an illumination means, a dithering means, and a scanning means. The illumination means provides a beam of light and may comprise a laser, a laser diode, or another light source. The dithering means, for example, a light guide and at least one piezoelectric element, may be used to dither the beam of light. The scanning means, for example, a microelectromechanical mirror, may be independent from said dithering means and may scan the dithered beam of light toward a target. Moreover, the scanning means may scan at a frequency lower than the frequency of the dithering means. For example, the dithering means may dither the beam of light at a frequency greater than about 10 KHz. In another embodiment the dithering means may dither the beam of light at a frequency between 5 KHz and 50 KHz. As another example, the scanning means may scan the beam of light at a frequency between 50 Khz and 100 KHz. In another embodiment, the scanning means may scan the beam of light at a frequency between 100 KHz and 1 MHz.

In another embodiment, the disclosure provides for another beam steering system comprising a light source that provides a beam of light, a piezoelectric tube, a scanning optical element, and a controller. The light source may be a laser. The piezoelectric tube may include a light guide and one or more piezoelectric elements. The piezoelectric tube may be coupled with the light source, such that at least a portion of the beam of light is conducted through the light guide. The scanning optical element may be coupled with the piezoelectric tube. The scanning optical element may include an optical element and a steering device. The controller may be communicatively coupled with the light source, the piezoelectric tube and the scanning optical element; and may include instructions to dither the beam of light with the piezoelectric tube and/or instructions to steer the beam of light with the scanning optical element.

In various embodiments, the steering device may include a microelectromechanical device. In various other embodiments, the optical element may include a mirror. The light source may include a laser or laser diode. In some embodiments, the light guide is cylindrical and/or comprises fiber optics. In some embodiments the light guide may include four piezoelectric elements distributed radially about the light guide and/or substantially equidistant from one another. The instructions to dither the beam of light may include instructions to deflect the beam of light such that the beam of light maps out a substantially circular pattern.

Another beam steering system is also provided according to another embodiment. The beam steering system may include a laser that provides a beam of laser light, a piezoelectric tube, a scanning microelectromechanical mirror, and a controller. The piezoelectric tube may be cylindrically shaped. The light guide may be housed within the piezoelectric tube and at least four piezoelectric elements may be coupled radially around the piezoelectric tube. The piezoelectric tube may be coupled with the laser such that at least a portion of a beam of laser light from the laser may be conducted through the light guide. The scanning microelectromechanical mirror may include a steering device coupled with the piezoelectric tube. The beam of light may be incident on the scanning microelectromechanical mirror after exiting the piezoelectric tube. The controller may be communicatively coupled with and control the operation of the light source, the piezoelectric tube, and the scanning microelectromechanical mirror. The controller may includes instructions to dither the beam of light with the piezoelectric tube and/or instructions to steer the beam of light with the scanning microelectromechanical mirror.

A beam steering method is also provided according to another embodiment. A beam of light is directed toward a light guide. One or more piezoelectric elements coupled with the light guide is activated. The activating dithers the beam of light according to a dither pattern. The dithered light may then be directed toward a steering optical element. The beam of light may then be steered toward a target with the steering optical element.

Further areas of applicability of the present disclosure will become apparent from the detailed description provided hereinafter. It should be understood that the detailed description and specific examples, while indicating various embodiments, are intended for purposes of illustration only and do not limit the scope of the disclosure. In one embodiment, the present disclosure provides for a beam deflection device comprising a light source that provides a beam of light, a piezoelectric tube, and a controller. The light source may be a laser, a laser diode, or another light source. The piezoelectric tube may include a light guide and one or more piezoelectric elements. The controller may be communicatively coupled with the light source, the piezoelectric tube and the scanning optical element; and may include instructions to activate one or more of the piezoelectric elements at a resonant frequency of the piezoelectric tube and/or the light guide.

In another embodiment the beam deflection device may include an optical tip. For example, the light guide may have a portion thereof that extends axially from an end of a piezoelectric tube. The controller may activate one or more of the piezoelectric elements at a resonant frequency of the optical tip. The optical tip may be a fiber-optic. The length of the optical tip may be selected such that the optical tip resonates at a desired frequency.

In various embodiments, the controller may activate one or more of the piezoelectric elements at a different activation voltage amplitude, current amplitude, and/or power level. For example, a piezoelectric tube including a light guide, one or more piezoelectric elements, and an optical tip may produce an elliptical deflection pattern when all the piezoelectric elements are activated with equal amplitude signals. The amplitudes of one or more of the activation signals may be increased or decreased to produce a circular deflection pattern.

A beam deflection method is also provided according to another embodiment. A beam of light is directed toward a light guide at least partially housed in a piezoelectric tube. A first piezoelectric element coupled with the piezoelectric tube is activated with a first activation signal having a first amplitude, for example, a sinusoidal voltage signal of a certain amplitude. A second piezoelectric element coupled with the piezoelectric tube is activated with a second activation signal having a second amplitude, for example, a sinusoidal voltage signal of a different amplitude.

Further areas of applicability of the present disclosure will become apparent from the detailed description provided hereinafter. It should be understood that the detailed description and specific examples, while indicating various embodiments, are intended for purposes of illustration only and do not limit the scope of the disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides various embodiment(s) only, and is not intended to limit the scope, applicability or configuration of the disclosure. Rather, the ensuing description of the various embodiment(s) will provide those skilled in the art with an enabling description for implementing various embodiments. It should be understood that various changes may be made in the function and arrangement of elements without departing from the spirit and scope as set forth in the appended claims.

Various embodiments of the invention provide for a decoupled beam dithering and beam steering device. That is, the dithering mechanism and the beam steering mechanisms are separated and can be independently controlled. This decoupling may allow for high frequency dithering with lower frequency steering, and/or provide low beam deviation dithering with higher beam deviation steering. A piezoelectric light guide may be used as the dithering mechanism. Such devices may have quick response times and may operate at high frequencies. One or more piezoelectric elements, for example, may provide a directional force on the light guide that deviates the beam of light. A microelectromechanical mirror, for example, may be used to steer the dithered beam of light.

Figure 1:
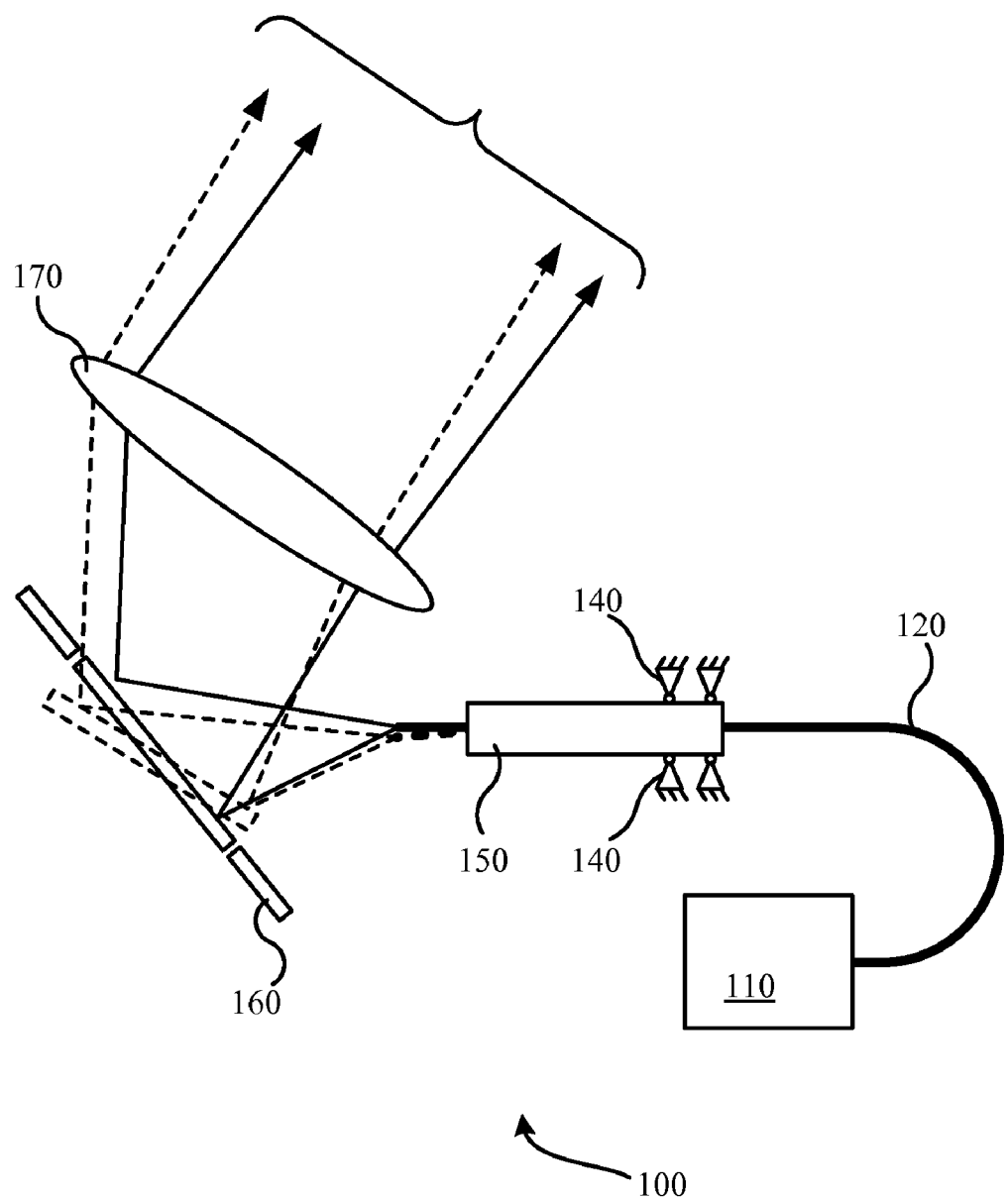
FIG. 1 shows a beam steering device that includes microelectromechanical mirror and a piezoelectric light guide according to one embodiment.

Referring first to FIG. 1, a beam steering device 100 that includes microelectromechanical mirror 160 and piezoelectric tube 150 is shown according to one embodiment. The beam steering device 100 also includes a lens 170, a laser 110 and a fiber-optic 120. The piezoelectric tube 150 may include a light guide and one or more piezoelectric elements 140. The light guide may include fiber-optics, crystal fibers, or any other type of waveguide. The laser 110 may include any type of laser operating with any wavelength. Indeed, the embodiments provided herein, do not require a specific wavelength and/or laser type. The lens 170 may include any type of optical element for focusing and/or collimating light. Moreover, in some embodiments the lens 170 may be positioned between piezoelectric tube 150 and microelectromechanical mirror 160. The piezoelectric tube 150 or piezoelectric tube, may include one or more piezoelectric elements 140. In one embodiment, the piezoelectric tube 150 includes four piezoelectric elements 140. The dithering and beam steering may be decoupled using the microelectromechanical mirror 160 for beam steering, and the piezoelectric tube 150 for dithering and/or nutation.

When a beam of light is conducted through the piezoelectric tube 150, the piezoelectric elements 140 may be activated to deflect the light guide in any direction depending on the placement of the piezoelectric elements 140 about the light guide and/or depending on the applied voltage on the piezoelectric elements 140. In some embodiments, the piezoelectric elements 140 may be used to deflect the light guide small distances at high frequencies. For example, in one embodiment, the piezoelectric elements 140 may deflect the light guide about ±5 µm. In another embodiment, the piezoelectric elements 140 may deflect the light guide between about ±1 µm and ±10 µm. As another example, in another embodiment, piezoelectric elements 140 may deflect the light guide between about ±10 µm and ±100 µm. In another embodiment, the piezoelectric elements 140 may deflect the light guide at a frequency greater than 1 kHz. In another embodiment, the piezoelectric elements 140 may deflect the light guide at a frequency between 10 kHz and 100 kHz. In another embodiment, the piezoelectric elements 140 may deflect the light guide at a frequency between about 100 kHz and 1 MHz. In another embodiment the piezoelectric elements 140 may deflect the light guide at a frequency greater than 1 MHz.

Figure 2A:
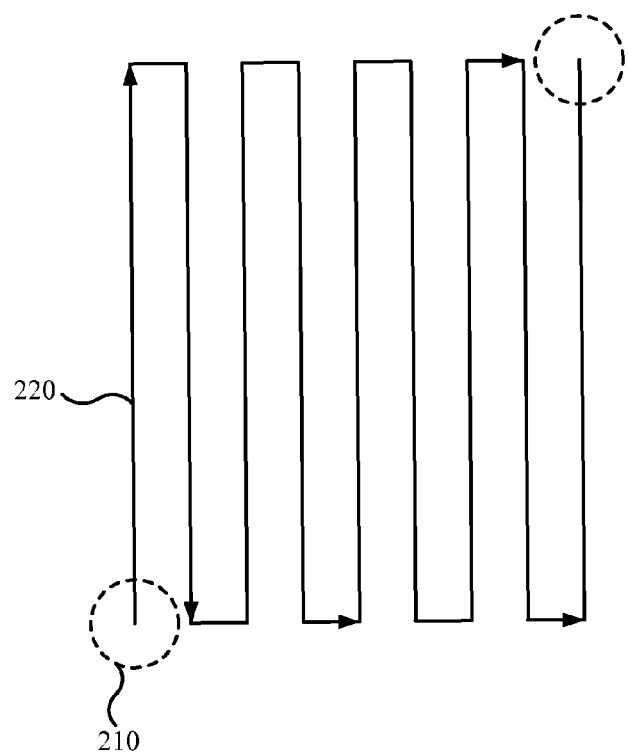
FIG. 2A shows a steering and dithering plan according to one embodiment.

The piezoelectric tube 150 may dither the beam of light according to various dithering patterns. For example, the piezoelectric tube 150 may dither the beam of light in a circular, oval, polygon-shaped and/or rectangular pattern. FIG. 2A shows an example of a circular dithering pattern 210.

Returning to FIG. 1, dithered light from the piezoelectric tube 150 is incident on the microelectromechanical mirror 160. The microelectromechanical mirror 160 may be used to steer or scan the light beam. This steering may occur over large angles and at slow frequencies. For example, in one embodiment, the microelectromechanical mirror 160 may steer a beam of light ±1°. In another embodiment, the microelectromechanical mirror 160 may steer a beam of light between ±1° and ±5°. In another embodiment, the microelectromechanical mirror 160 may steer a beam of light between ±5° and ±10°. In another embodiment, the microelectromechanical mirror 160 may steer a beam of light at a frequency of about 100 Hz. In another embodiment, the microelectromechanical mirror 160 may steer a beam of light at a frequency between about 10 Hz and 500 Hz.

Figure 2B:
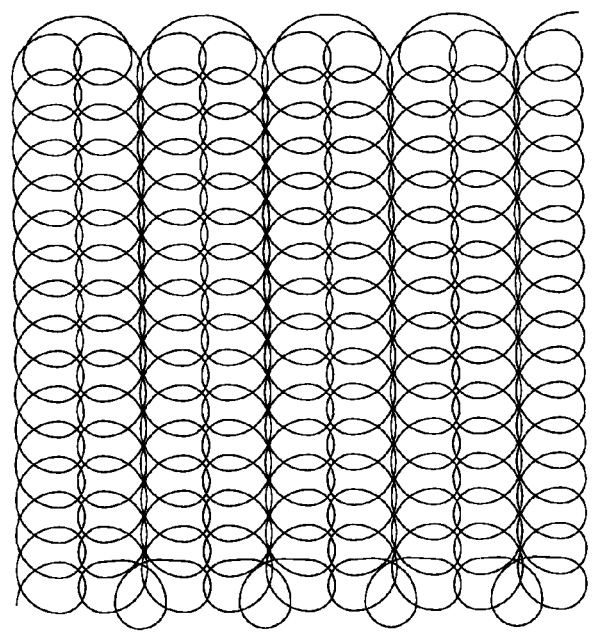
FIG. 2B shows the resulting steering and dithering pattern according to one embodiment.

FIG. 2A shows a raster scan steering pattern 220. While a fixed steering pattern is shown, the steering pattern may also be random, a linear pattern or vary over time. By combining the steering and the dithering, a pattern of moving circles is produced as shown in FIG. 2B. This decoupling of the steering and dithering by using a separate device for each, may allow for higher dithering speeds, lighter weight components, higher steering angles, greater portability, simplified controls, etc. Moreover, the controls can be designed to resonate with the piezoelectric elements and/or the microelectromechanical mirror in order reduce power consumption.

Figure 3:
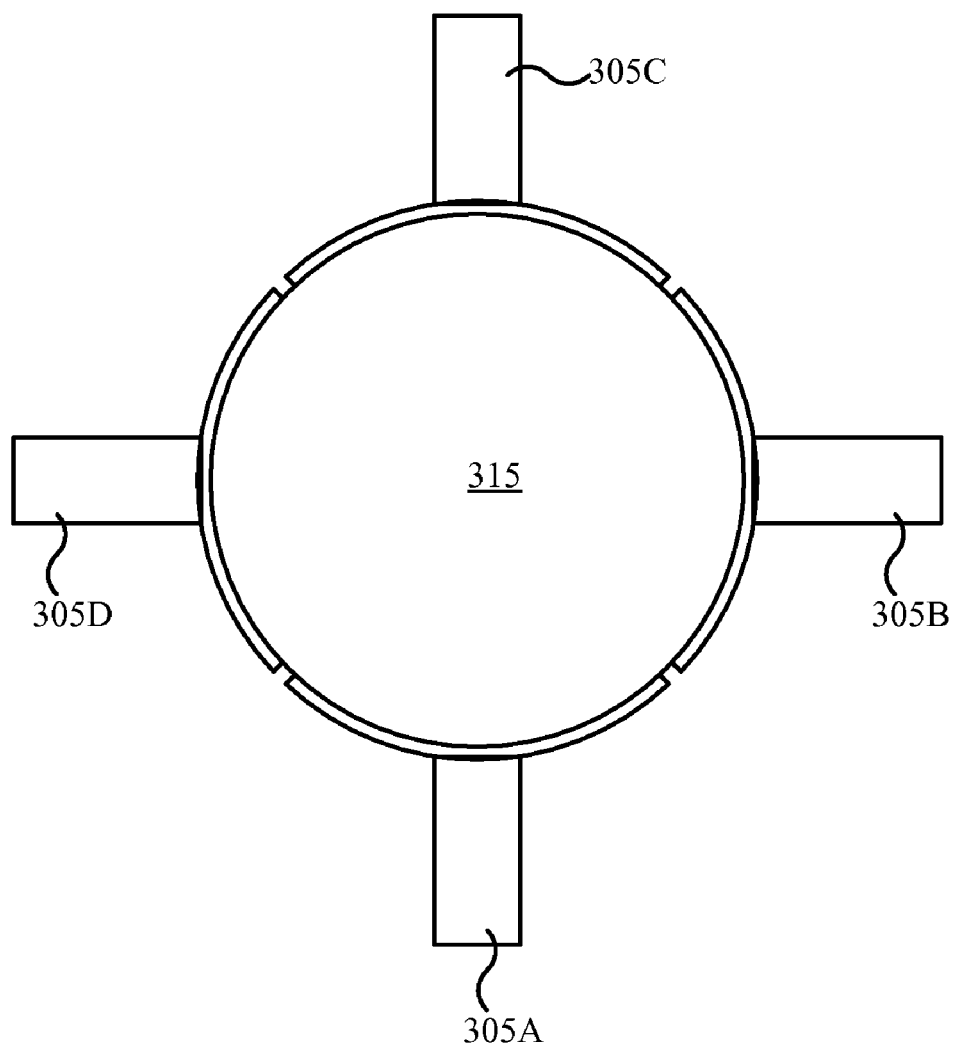
FIG. 3 shows an end view of a piezoelectric light guide including four piezoelectric elements according to one embodiment.

FIG. 3 shows an end view of a piezoelectric light guide 315 that includes four piezoelectric elements 305 according to one embodiment. The four piezoelectric elements 305 are arrayed approximately 90° from each other around the piezoelectric light guide 315. Each piezoelectric element 305 may provide a directional force to the piezoelectric light guide 315, and thus deflect the light guide 315 a small amount. Moreover, opposing piezoelectric elements, such as, 305-D and 305-B as well as 305-A and 305-C, may coordinate by simultaneously applying positive and negative directional forces. Using these piezoelectric elements 305, the light guide 315 may be deflected according to any time varying functions. For example, the piezoelectric light guide 315 may be deflected in a circular pattern by varying the electric charge incident on the piezoelectric elements 305 over time using time varying sinusoidal functions.

Figure 6A:
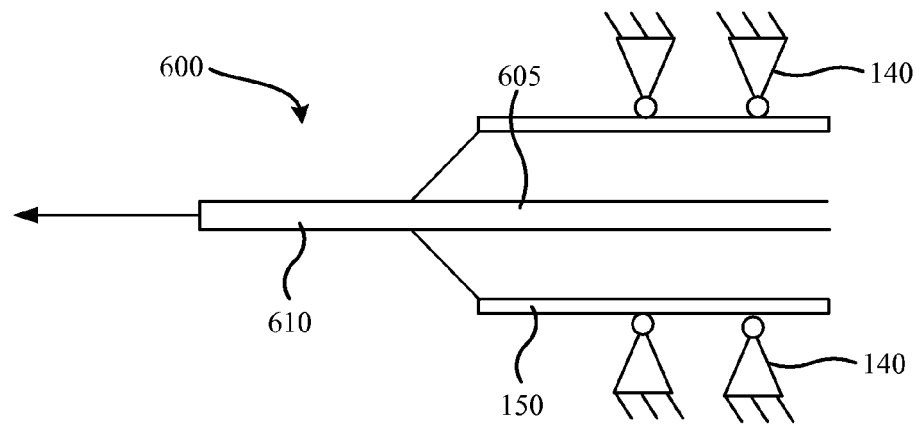
FIG. 6A shows a beam deflection device according to one embodiment.

In some embodiments, beam steering system 100 may incorporate beam deflection device 600 as shown in FIG. 6A. For example, beam steering system 100 may incorporate beam deflection device 600 to dither a beam of light. As shown in this embodiment, beam deflection device 600 includes piezoelectric tube 150, piezoelectric elements 140, light guide 605, and optical tip 610 extending out of the piezoelectric tube 150 according some embodiments. The piezoelectric elements 140 may be arrayed radially around the light guide 605 such that time varying voltage signals may create a deflection pattern, for example, sinusoidal time-varying voltage signals may create a circular deflection pattern.

Figure 6B:
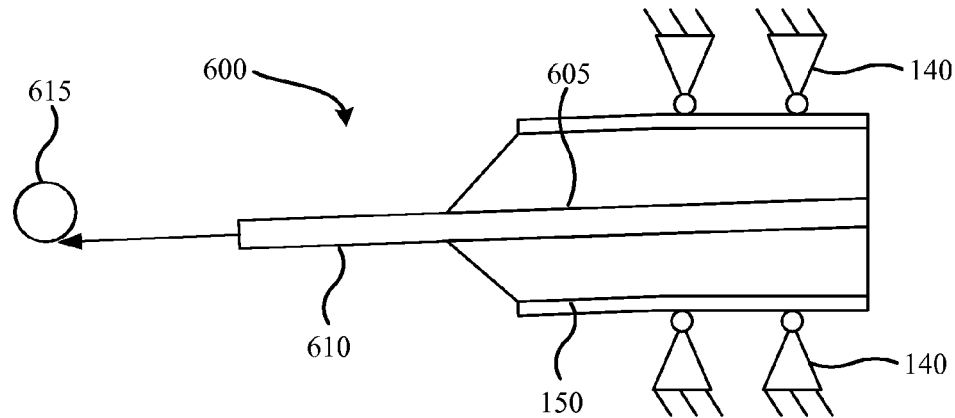
FIG. 6B shows a beam deflection device and resulting deflection pattern according to another embodiment.
Figure 6C:
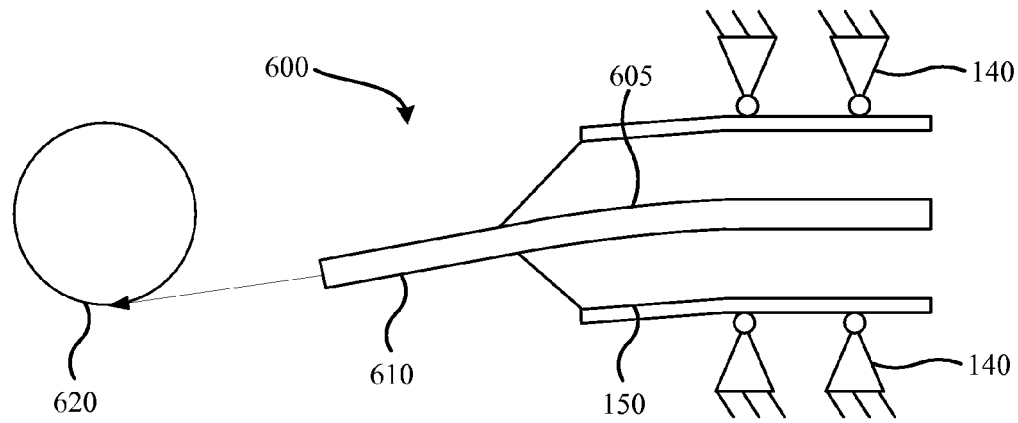
FIG. 6C shows a beam deflection device and resulting deflection pattern according to another embodiment.

According to some embodiments, FIG. 6B shows activation of the piezoelectric elements 140 with sinusoidal signals of a certain voltage amplitude at a non-resonant frequency, resulting in deflection of the light guide and/or the optical tip. By sinusodially oscillating the piezoelectric elements a circular deflection pattern 615 is created. FIG. 6C shows activation of the piezoelectric elements 140 with sinusoidal signals of the same voltage amplitude as FIG. 6B, but at a resonant frequency of the piezoelectric tube 150, the light guide 605, and/or the optical tip 610 according to some embodiments. As shown in the figure, not only is the light guide and/or the optical tip deflected, the fiber optic tip 610 is also deflected resulting in a circular deflection pattern 620 that is substantially larger than is achieved by activating the piezoelectric elements at the non-resonant frequency (deflection of the light guide 605 not shown). For example, the amplitude of deflection of optical tip 610 may be 1-5 µm when the piezoelectric elements 140 are activated with sinusoidal signals of a certain voltage amplitude, for example V peak-to-peak, at a non-resonant frequency. Further by way of example, the amplitude of deflection of optical tip 610 may be approximately 100 µm when the piezoelectric elements 140 are activated with sinusoidal signals of the same voltage amplitude at a resonant frequency of the optical tip 610.

The resonant frequencies of the piezoelectric tube 150, the light guide 605, and/or the optical tip 610 may be dependent on the length of the unsupported portion of the piezoelectric tube 150, the length of the light guide 605, and/or the length of the optical tip 610. Additionally, the resonant frequencies may be dependent on the diameter and/or material composition of the piezoelectric tube 150, the light guide 605, and/or the optical tip 610. Moreover, resonance may also be dependant on the atmospheric conditions where the device is located. For example, an optical tip made of fiber-optic material with a tip length of 1.37 mm was found to resonate at a frequency of 38 kHz. As another example, an optical tip made of fiber-optic material with a tip length of 1.25 mm was found to resonate at a frequency of 40 kHz. The amplitude of the deflection may be dependent on the length, diameter, and/or material composition of the piezoelectric tube 150, the light guide 605, and/or the optical tip 610. In some embodiments, properties such as length, cross-section, diameter, and/or material composition of the piezoelectric tube 150, the light guide 605, and/or the optical tip 610 may be selected such that at least one of the components resonates at a desired frequency. The desired resonant frequency for a component may be chosen to be above the frequency of external effects on a light beam such as beam wandering caused by varying atmospheric conditions. In some embodiments, the above properties may be selected to achieve a desired amplitude of deflection with a particular activation voltage amplitude, current amplitude, or power level. For example, a deflection pattern of a given amplitude may be achieved with a lower power level than otherwise required by activating the piezoelectric elements at a resonant frequency.

While optical tip 610 is shown by FIGS. 6A, 6B, and 6C as an extension of light guide 605, in some embodiments, optical tip 610 may be a separate component optically coupled to light guide 605, and optionally may be a different material composition as light guide 605. Optical tip 610 may have a circular, square, rectangular, or other polygonal shape in some embodiments. In addition, in some embodiments, the use of resonance to achieve larger deflection of a beam may be accomplished with no optical tip, and the piezoelectric tube may be activated at a resonant frequency of the piezoelectric tube 150 and/or the light guide 605.

Figure 7A:
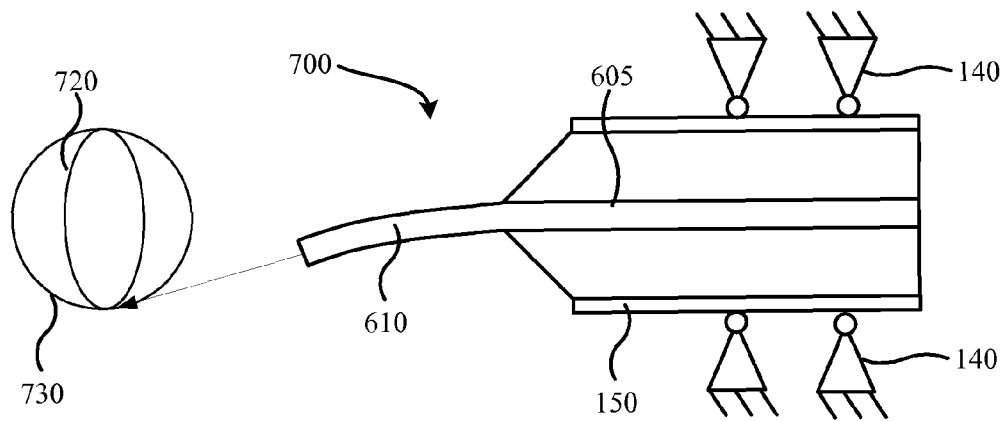
FIG. 7A shows a beam deflection device and resulting deflection patterns according to another embodiment.
Figure 7B:
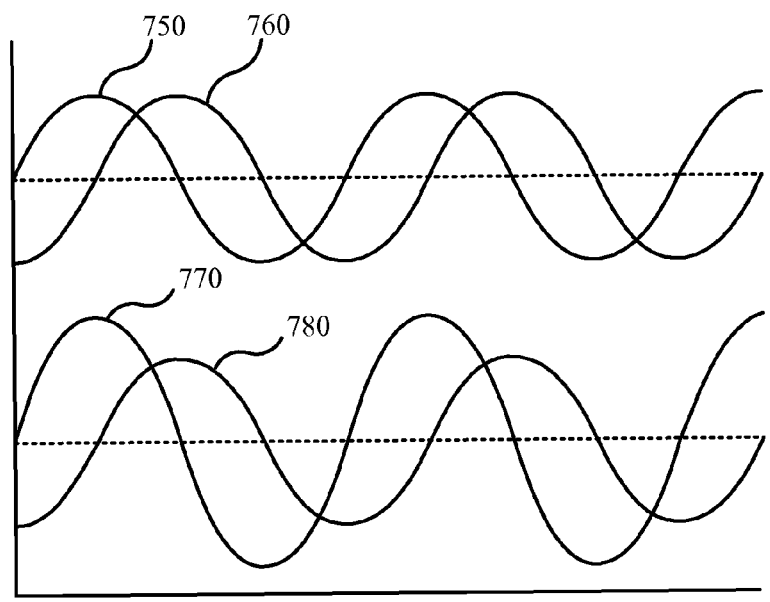
FIG. 7B shows example activation waveforms for a beam deflection device according to one embodiment.

Depending on a desired dither pattern and characteristics of the piezoelectric tube 150, the light guide 605, and/or the optical tip 610, it may be desirable to drive one or several of the piezoelectric elements 140 at a different voltage amplitude, current amplitude, and/or power level to achieve the desired pattern. FIG. 7A shows a beam deflection device 700 with piezoelectric tube 150, piezoelectric elements 140, light guide 605, and optical tip 610 extending out of the piezoelectric tube 150 according to one embodiment. Beam deflection device 700 may be operated by activating piezoelectric elements 140 according to voltage waveforms shown in FIG. 7B. Merely by way of example, when two piezoelectric elements corresponding to two axes of deflection are activated with example sinusoidal voltage signals 750 and 760 having the same voltage amplitude (voltage signals for other piezoelectric elements not shown), the deflection pattern may describe an elliptical pattern as shown by deflection pattern 720 as a result of directional differences in mechanical properties of the beam deflection device 700. The voltage amplitudes for one or more piezoelectric elements may be varied as shown by voltage signals 770 and 780 with different amplitudes, resulting in a substantially circular beam deflection pattern 730. In some embodiments the activation signals for some or all of the piezoelectric elements 140 may be varied to achieve a desired deflection pattern.

According to one embodiment, a piezoelectric tube with four piezoelectric elements arrayed radially around a light guide and an optical tip made of fiber-optic extending out from the piezoelectric tube a distance of 1.37 mm was tested. The four piezoelectric elements were driven with channels A+, A−, B+, and B− comprising quadrature sinusoidal voltage signals such that piezoelectric elements opposite of each other (e. g. A+ and A−) were activated at a phase angle of 180°, and adjacent piezoelectric elements (e.g. A+ and B+) were activated at a 90° phase angle at a resonant frequency of the optical tip of 38 kHz. A circular deflection pattern was achieved with an optical tip deflection of 42 µm by activating channels A+ and A− with a voltage amplitude of 17.6 V peak-to-peak and activating channels B+ and B− with a voltage amplitude of 12.8 V peak-to-peak.

Figure 4:
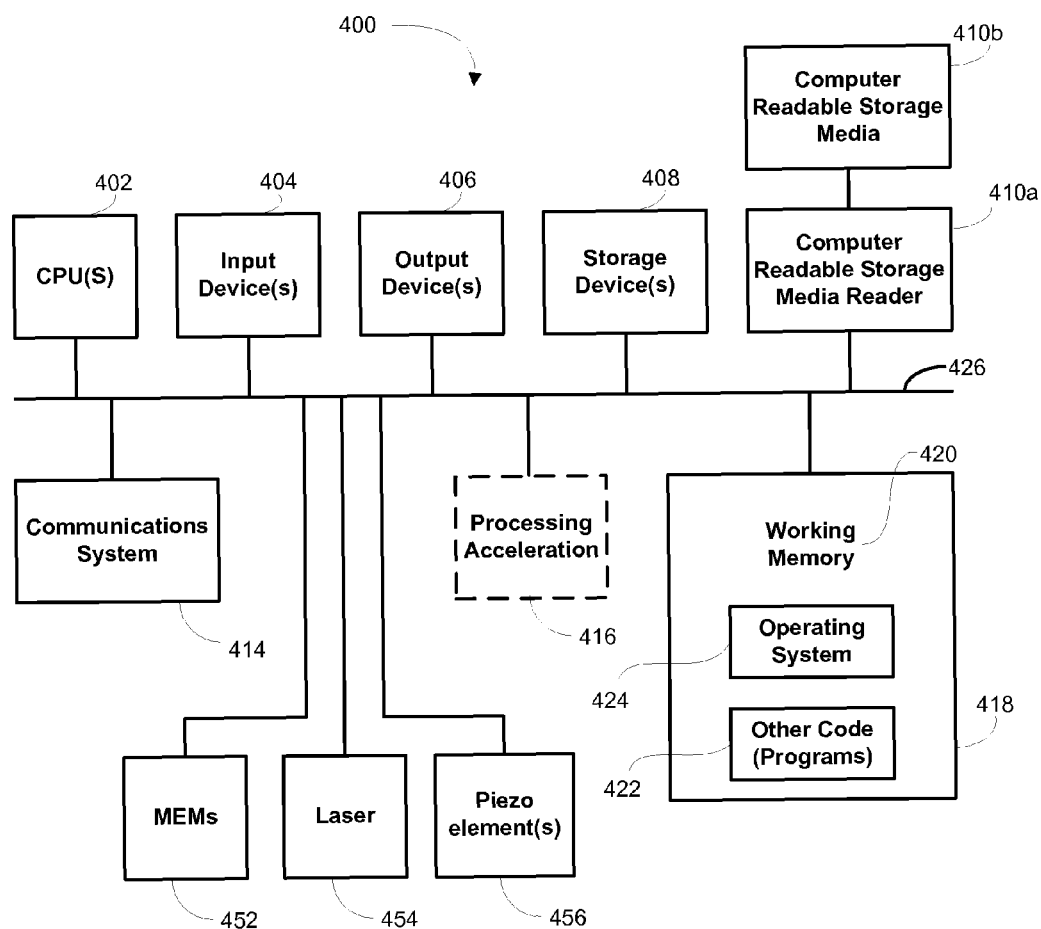
FIG. 4 provides a schematic representation of a computer system that may be used to implement various methods of the invention.

Operation of a beam steering device may be coordinated with a computational system like that shown schematically in FIG. 4. The drawing broadly illustrates how individual system elements may be implemented in a separated or more integrated manner. The computational device 400 is shown comprised of hardware elements that are electrically coupled via bus 426, which is also coupled with the portions of the beam steering device that may include, for example, a microelectromechanical mirror 452, a laser, and piezoelectric element(s) 454. The hardware elements include a processor 402, an input device 404, an output device 406, a storage device 408, a computer-readable storage media reader 410a, a communications system 414, a processing acceleration unit 416 such as a DSP or special-purpose processor, and a memory 418. The computer-readable storage media reader 410a is further connected to a computer-readable storage medium 410b, the combination comprehensively representing remote, local, fixed, and/or removable storage devices plus storage media for temporarily and/or more permanently containing computer-readable information. The communications system 414 may comprise a wired, wireless, modem, and/or other type of interfacing connection and permits data to be exchanged with external devices.

The computational device 400 also comprises software elements, shown as being currently located within working memory 420, including an operating system 424 and other code 422, such as a program designed to implement methods of the invention. It will be apparent to those skilled in the art that substantial variations may be used in accordance with specific requirements. For example, customized hardware might also be used and/or particular elements might be implemented in hardware, software (including portable software, such as applets), or both. Further, connection to other computing devices such as network input/output devices may be employed.

Figure 5:
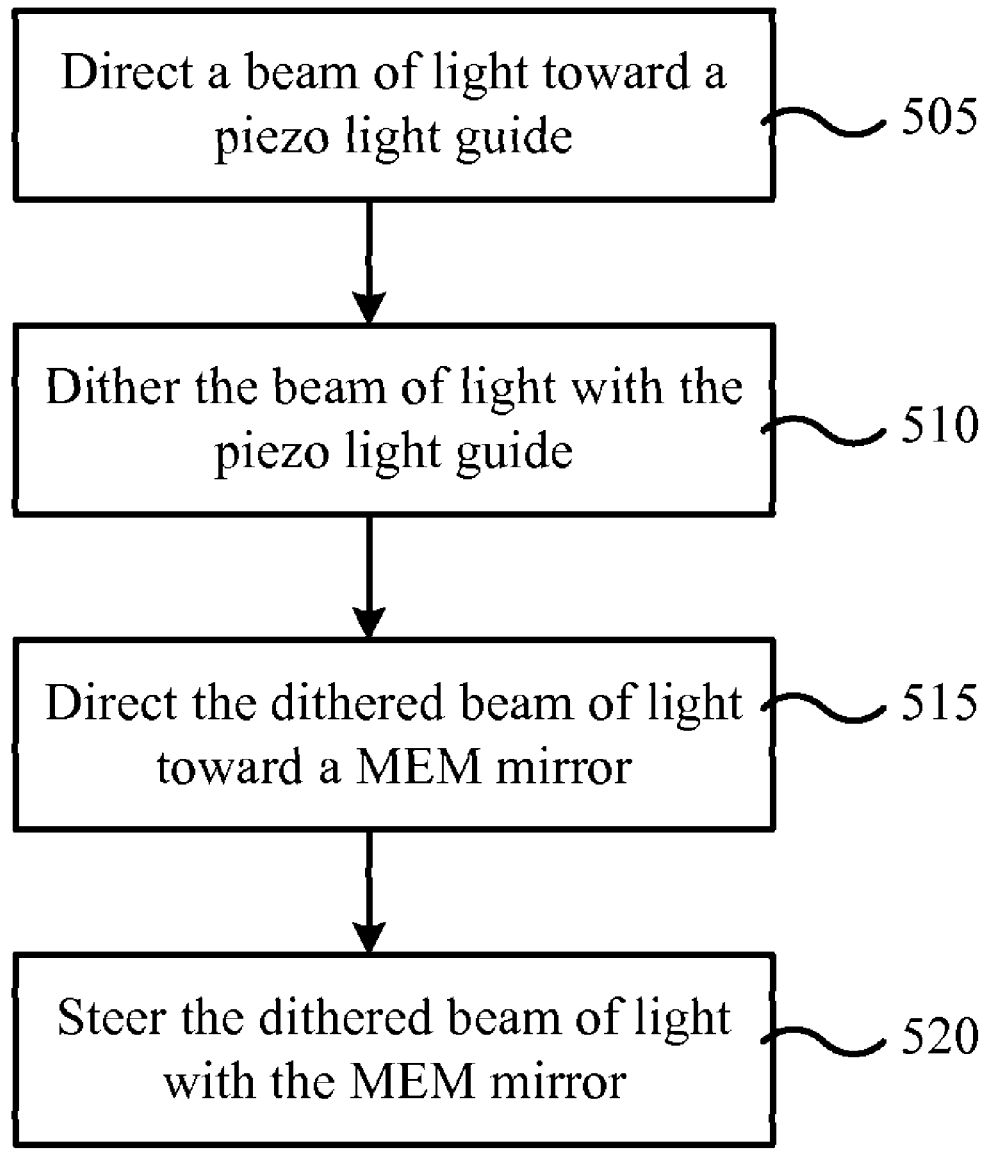
FIG. 5 shows a flowchart of another embodiment.

FIG. 5 shows a flowchart of another embodiment. A beam of light is directed toward a piezoelectric light guide as shown in block 505. For example, a laser beam may be directed toward a piezoelectric light guide. The piezoelectric light guide may then dither the beam of light according to a dithering pattern at block 510. For example the pattern may be made using a time varying function. As one example, the time varying function may produce a circular or oval dither pattern. The dithered light may then be directed toward a microelectromechanical (MEM) mirror at block 515. The dithered light may then be steered with the microelectromechanical mirror at block 520. As described in other embodiments the dithering may occur at high frequencies and produce small deviations in the beam of light, where as the steering may occur at lower frequencies and produce larger deviations in the beam of light.

Figure 8:
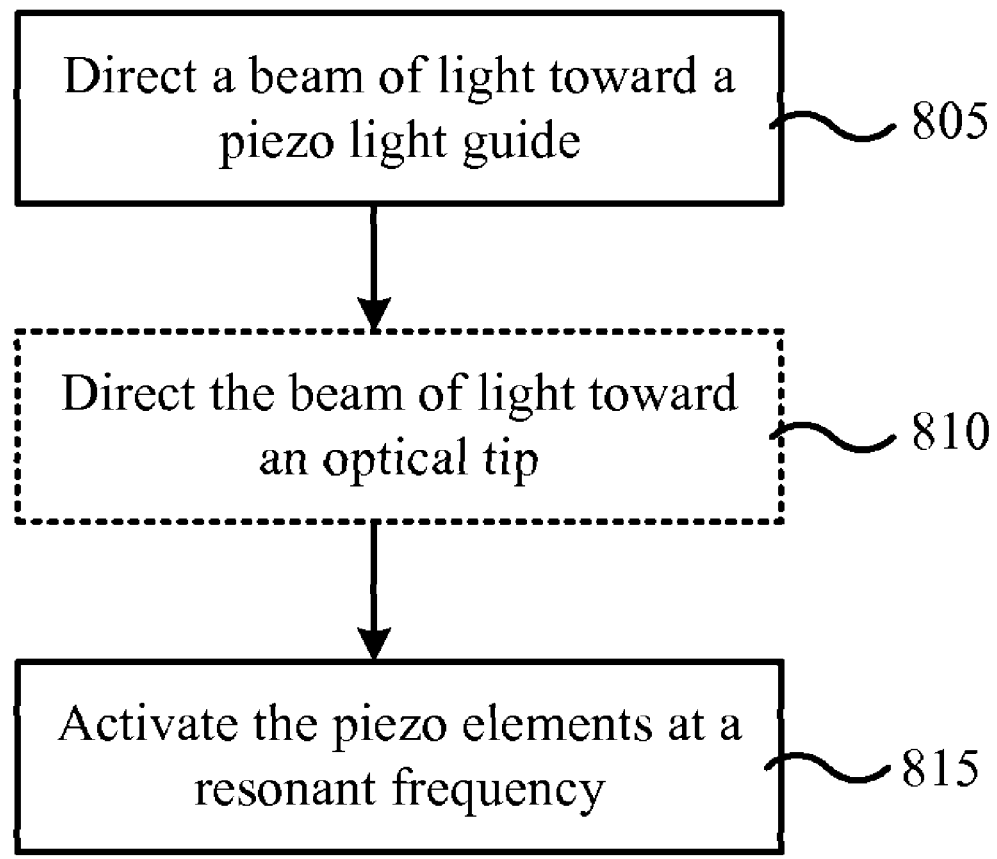
FIG. 8 shows a flowchart of another embodiment.

FIG. 8 shows a flowchart according to one embodiment. A beam of light is directed toward a piezoelectric light guide as shown in block 805. For example, a laser beam may be directed into a piezoelectric light guide. A portion of the piezoelectric light guide, for example, a fiber-optic, may be placed within a piezoelectric tube. Optionally the beam of light may be directed through the piezoelectric light guide toward an optical tip as shown in block 810. For example, the piezoelectric light guide may have a fiber-optic tip that extends axially from a piezoelectric tube. The piezoelectric elements coupled with the piezoelectric tube may be activated at a resonant frequency at step 815. As one example, the piezoelectric elements are activated at a resonant frequency of the fiber-optic tip extending axially from a piezoelectric tube to create a greater deflection at a certain activation power.

Figure 9:
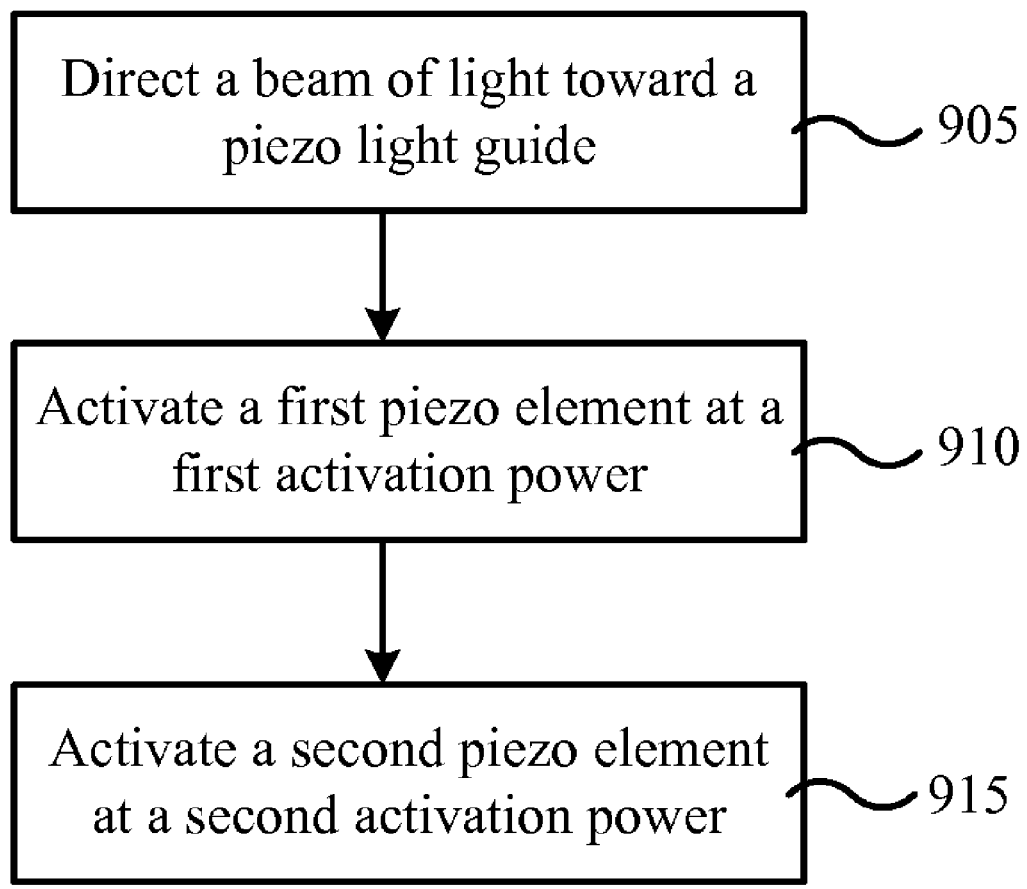
FIG. 9 shows a flowchart of another embodiment.

FIG. 9 shows a flowchart according to another embodiment. A beam of light is directed toward a piezoelectric light guide as shown in block 905. For example, a laser beam may be directed toward a piezoelectric light guide or fiber-optic. A first piezoelectric element is activated at a first activation power at step 910. A second piezoelectric element is activated at a second activation power at step 915. For example, one or more piezoelectric elements may be arrayed radially around a piezoelectric light guide, wherein a first set are activated with a sinusoidal signal at a particular voltage amplitude and a second set are activated with a sinusoidal signal at a different voltage amplitude to effect a particular pattern of deflection.

Specific details are given in the above description to provide a thorough understanding of the embodiments. However, it is understood that the embodiments may be practiced without these specific details. For example, circuits, structures, and/or components may be shown in block diagrams in order not to obscure the embodiments in unnecessary detail. In other instances, well-known circuits, processes, algorithms, structures, components, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory contents. Information, arguments, parameters, data, etc., may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

While the principles of the disclosure have been described above in connection with specific apparatuses and methods this description is made only by way of example and not as limitation on the scope of the disclosure.

What is claimed is:

1. A beam deflection system comprising:
a light source providing a beam of light;
a piezoelectric tube including a light guide and a plurality of piezoelectric elements, wherein a first end of the piezoelectric tube is coupled with the light source such that at least a portion of the beam of light is conducted through the light guide; and
a controller communicatively coupled with the plurality of piezoelectric elements, wherein:
the controller includes instructions to deflect the beam of light with the light guide by activating more than one of the plurality of piezoelectric elements using more than one activation signals.

2. The beam deflection system according to claim 1, wherein the controller includes instructions to deflect the beam of light with the light guide at a resonant frequency of the piezoelectric tube.

3. The beam deflection system according to claim 1, further comprising an optical tip optically coupled with the light guide, the optical tip extending axially from a second end of the piezoelectric tube; and
wherein the controller includes instructions to deflect the beam of light with the optical tip at a resonant frequency of the optical tip.

4. The beam deflection system according to claim 3, wherein the optical tip comprises a fiber-optic.

5. The beam deflection system according to claim 3, wherein the optical tip comprises a separate component optically coupled with the light guide.

6. The beam deflection system according to claim 3, wherein the light guide has a section thereof serving as the optical tip.

7. The beam deflection system according to claim 1, wherein the light guide comprises a fiber-optic.

8. The beam deflection system according to claim 1, wherein the light source comprises a laser.

9. The beam deflection system according to claim 1, wherein the light guide is cylindrical.

10. The beam deflection system according to claim 1, wherein the piezoelectric tube includes four piezoelectric elements distributed radially about the light guide and substantially equidistant from one another.

11. The beam deflection system according to claim 1, wherein the instructions to deflect the beam of light comprises instructions to deflect the beam of light such that the beam of light maps out a substantially circular pattern.

12. A beam deflection system comprising:
a fiber-optic light guide including a first end portion and a second end portion;
a light source providing a beam of light, wherein the beam of light is incident on the first end portion of the fiber-optic light guide, such that at least a portion of the beam of light is conducted through the fiber-optic light guide;
a piezoelectric tube including one or more piezoelectric elements, the piezoelectric tube coupled with the fiber-optic light guide such that at least a portion of the fiber-optic light guide is housed in the piezoelectric tube and the second end portion extends axially from the piezoelectric tube;
a controller communicatively coupled with the piezoelectric tube, wherein the controller includes instructions to deflect the beam of light by activating the piezoelectric elements at a resonant frequency of the second end portion of the fiber-optic light guide.

13. The beam deflection system according to claim 12, wherein a length of the second end portion of the fiber-optic light guide extending axially from the piezoelectric tube is selected such that said second end portion will resonate at a desired frequency.

14. The beam deflection system according to claim 12, wherein a diameter of the second end portion of the fiber-optic light guide extending axially from the piezoelectric tube is selected such that said second end portion will resonate at a desired frequency.

15. The beam deflection system according to claim 12, wherein the light source comprises a laser.

16. A beam deflection system comprising:
light generating means for providing a beam of light;
light directing means for directing the beam of light;

a first directional force applying means for applying a first directional force in conjunction with the light directing means; and a second directional force applying means for applying a second directional force in conjunction with the light directing means, said light directing means responsive to the first and second directional force applying means such that the direction of the beam of light is altered by the light directing means when either or both of the first and second directional force applying means are activated; and activating means for activating the first and second directional force means, wherein the activating means is adapted to activate either or both of the first and second directional force applying means at a resonant frequency.

17. The beam deflection system according to claim 16, wherein the activating means is adapted to activate the directional force applying means at a resonant frequency of the light directing means.

18. The beam deflection system according to claim 16, wherein:

at least an end portion of the light directing means is unsupported such that said end portion vibrates in response to activation of the directional force means; and the activating means is adapted to activate the directional force applying means at a resonant frequency of the unsupported end portion of the light directing means.

19. A beam deflection system comprising:

a light source providing a beam of light;

a piezoelectric tube including a first piezoelectric element, a second piezoelectric element and a light guide, wherein a first end of the piezoelectric tube is coupled with the light source, such that at least a portion of the beam of light is conducted through the light guide; and a controller communicatively coupled with the first and second piezoelectric elements, wherein:

the controller includes instructions to deflect the beam of light by activating the piezoelectric elements, the controller includes instructions to activate the first piezoelectric element with a first activation signal having a first amplitude, and the controller includes instructions to activate the second piezoelectric element with a second activation signal having a second amplitude.

20. The beam deflection system according to claim 19, wherein the light guide comprises a fiber-optic.

21. The beam deflection system according to claim 19, wherein the instructions to deflect the beam of light comprises instructions to deflect the beam of light such that the beam of light maps out a substantially circular pattern.

22. A method of beam deflection comprising:

directing a beam of light toward a first end of a light guide at least partially housed in a piezoelectric tube such that at least a portion of the beam of light is conducted through the light guide;

activating one or more piezoelectric elements coupled with the piezoelectric tube at a resonant frequency; and configuring the light guide such that a second end portion of the light guide extends axially from the piezoelectric tube;

wherein the resonant frequency is a resonant frequency of the second end portion of the light guide.

23. The method of claim 22, wherein the resonant frequency is a resonant frequency of the piezoelectric tube.

24. A method of beam deflection comprising:

directing a beam of light toward a first end of a piezoelectric tube such that at least a portion of the beam of light is conducted through a light guide at least partially housed in the piezoelectric tube;

activating a first piezoelectric element coupled with the piezoelectric tube with a first activation signal having a first amplitude; and activating a second piezoelectric element coupled with the piezoelectric tube with a second activation signal having a second amplitude.

* * * * *